United States Patent [19]
Pickeral et al.

[11] Patent Number: 6,058,176
[45] Date of Patent: May 2, 2000

[54] METHOD OF AND SYSTEM FOR TERMINATING CALLS TO SELECTED TRUNK GROUP MEMBERS

[75] Inventors: Eddie L. Pickeral, Plano; Shailin Sehgal, Allen, both of Tex.

[73] Assignee: MCI Communications Corporation, Washington, D.C.

[21] Appl. No.: 08/986,441

[22] Filed: Dec. 8, 1997

[51] Int. Cl.[7] .................................................. H04M 3/42
[52] U.S. Cl. .......................................... 379/207; 379/220
[58] Field of Search .................................... 379/242, 243, 379/244, 245, 246, 90.01, 201, 207, 219, 220, 221

[56] References Cited

U.S. PATENT DOCUMENTS

| 5,717,746 | 2/1998 | Kamiya | 379/246 |
| 5,825,866 | 10/1998 | Fujitsuka et al. | 379/246 |
| 5,838,769 | 11/1998 | McNeil et al. | 379/220 |
| 5,867,495 | 2/1999 | Elliott et al. | 379/144 |

Primary Examiner—Scott Wolinsky

[57] ABSTRACT

A method of and system for providing selective trunk group member termination service in a network of telecommunications switches. Each trunk group at a terminating switch that requires selective trunk member termination is identified by a terminating member trunk group parameter. A data access point (DAP) that is accessible by the switches of the network to provide call routing and number translation services identifies a set of trunk group members selected for selective trunk group member termination by means of a trunk group member range parameter. When a call is received at an originating switch of the network, the originating switch queries the DAP and the DAP returns call routing information. If the call requires selective trunk member termination, the call routing information includes the trunk group member range parameter. A terminating switch determines whether or not it has received a trunk group member range parameter for a call, the switch determines whether the terminating member trunk group parameter for the trunk group to which the call is to be terminated is set to yes. If so, the terminating switch attempts to complete the call to a truck group member in the range specified by the trunk group member range parameter.

25 Claims, 3 Drawing Sheets

METHOD OF AND SYSTEM FOR TERMINATING CALLS TO SELECTED TRUNK GROUP MEMBERS

FIELD OF THE INVENTION

The present invention relates generally to telecommunications call processing, and more particularly to a method of and system for providing selective trunk group termination services in telecommunications networks.

DESCRIPTION OF THE PRIOR ART

Large telephone customers with high volumes of calls typically are connected to their long distance provider by a trunk group. A trunk group comprises a plurality of trunk group members. The trunk group is connected between the customer's private switch and a switch of the long distance provider.

Certain large telephone customers have special services, such as virtual private network services (VNET) and 800 services in addition to normal telephone services. When a call is placed to a customer with VNET and/or 800 service, the call may be terminated over any one of the members of the trunk group assigned to the customer. Currently, except for B-Channel negotiation in Primary Rate Interface (PRI) trunks, there is no mechanism by which a customer can allocate certain trunk members to calls of one type and certain other trunk members to calls of another type.

SUMMARY OF THE INVENTION

The present invention provides a method of and system for providing selective trunk group member termination service in a network of telecommunications switches. Each trunk group at a terminating switch is assigned a terminating member trunk group parameter. The terminating trunk group parameter for a trunk group that requires selective trunk member termination is set to yes. A data access point (DAP) that is accessible by the switches of the network to provide call routing and number translation services identifies a set of trunk group members selected for selective trunk group member termination by means of a trunk group member range parameter. The trunk group member range parameter specifies the trunk group members that are selected for termination of calls of a particular type to a particular customer.

When a call is received at an originating switch of the network, the originating switch determines whether or not the originating switch requires the services of the DAP. Examples of calls for which an originating switch requires DAP services are 800 calls and virtual private network (VNET) calls. If DAP services are required, the switch queries the DAP and the DAP returns call routing information. If the call requires selective trunk member termination, the call routing information returned by the DAP includes the trunk group member range parameter. If the call is to be terminated at a switch of the network other than the originating switch, the originating switch transports the call in accordance with routing information to a terminating switch along with the trunk group member range parameter as part of super generic digits or other signaling protocol. If the call is to be terminated at the originating switch, the originating switch performs terminating switch processing.

A terminating switch determines whether or not it has received a trunk group member range parameter for a call, either in signaling transported with the call from an originating switch or from the DAP in the case where the terminating switch and the terminating switch are the same. If the terminating switch has received a trunk group member range parameter, the switch determines whether the terminating member trunk group parameter for the trunk group to which the call is to be terminated is set to yes. If so, the terminating switch attempts to complete the call to a truck group member in the range specified by the trunk group member range parameter. If not, the terminating switch still attempts to complete the call to a truck group member in the range specified by the trunk group member range parameter, but records an exception in an exception log.

If the terminating switch has received a call to be completed to a trunk group without a trunk group member range parameter, the switch again determines whether the terminating member trunk group parameter for the trunk group to which the call is to be terminated is set to yes. If so, the terminating switch determines whether or not a DAP query has already been performed for the call. If not, the terminating switch queries the DAP. If the DAP returns a trunk group member range parameter, the terminating switch attempts to complete the call to a truck group member in the range specified by the trunk group member range parameter. If the DAP does not return a trunk group member range parameter, the terminating switch attempts to complete the call according to normal call processing and logs an error.

DESCRIPTION OF THE PREFERRED EMBODIMENT

Figure 1:
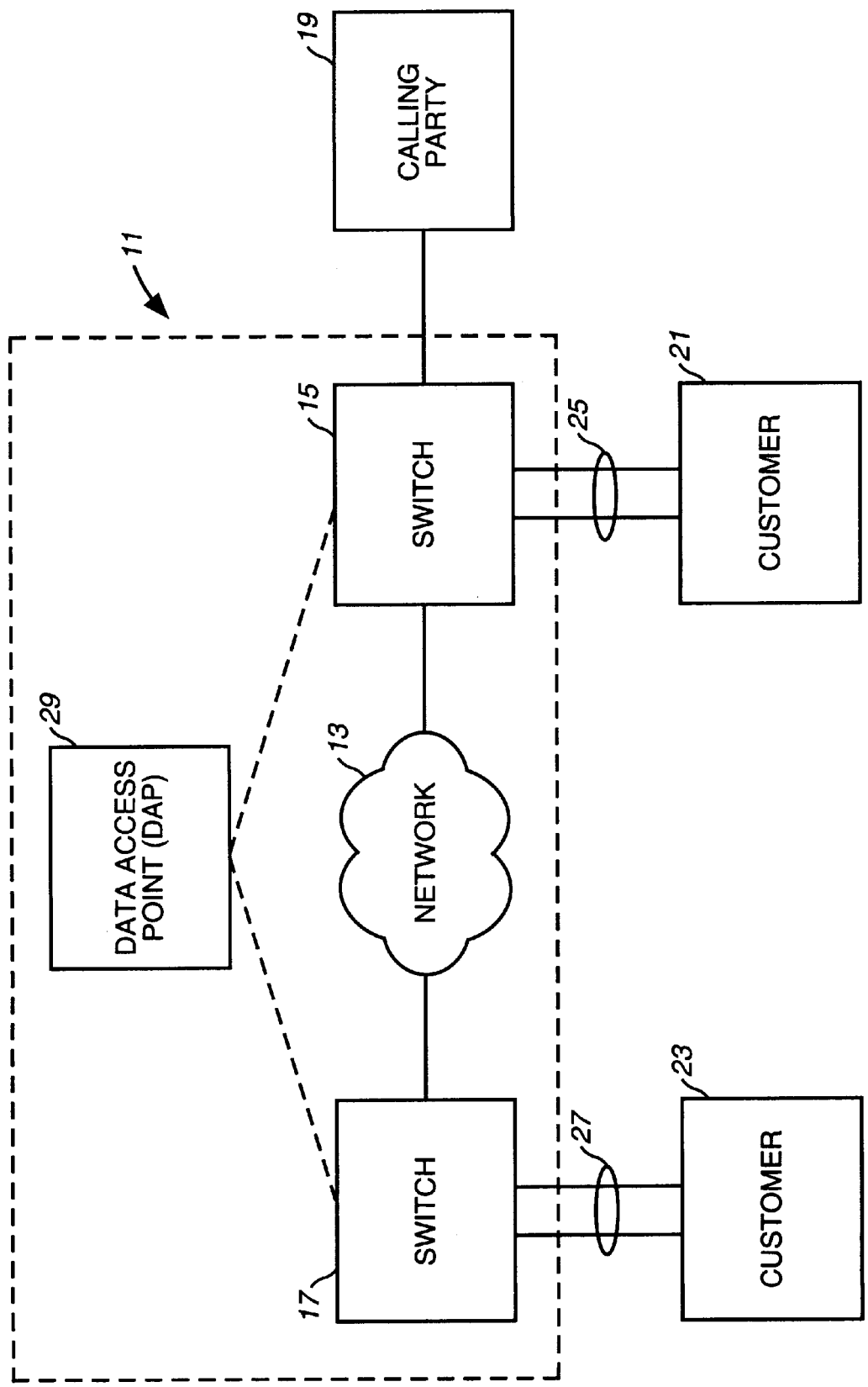
FIG. 1 is a block diagram of a telecommunications network according to the present invention.

Referring now to the drawings, and first to FIG. 1, a telephone system is designated generally by the numeral 11. A network 13 provides connectivity among a plurality of switches, including a switch 15 and a switch 17. In the example of FIG. 1, switch 15 is an originating switch and switch 17 is a terminating switch. However, as those skilled in the art will recognize, switches 15 and 17 can serve as either originating or terminating switches or as bridging switches.

In FIG. 1, a calling party is designated generally by the numeral 19. Calling party 19 is shown connected to originating switch 15. As those skilled in the art will recognize, the connection between calling party 19 and originating switch 15 may be through any of several means, such as through a local exchange carrier. In the example of FIG. 1, a call from calling party 19 may be directed either to a first customer 21 or a second customer 23. Customers 21 and 23 are connected to system 11 by trunk groups 25 and 27, respectively. Trunk group 25 is connected between first customer 21 and originating switch 15 and second trunk group 27 is connected between second customer 23 and terminating switch 17. Each of trunk groups 25 and 27 include a plurality of trunk group members.

Telephone system 11 provides, in addition to regular telephone service, 800 service and VNET service. When an originating switch of system 11 receives a normal telephone call, it routes the call to the appropriate terminating switch in the network. If switch 15 were to receive a normal call from calling party 19 to a number at second customer 23, switch 15 would route the call through network 13 to terminating switch 17 and terminating switch 17 would complete the call to the number at customer 23. However, an originating switch of system 11 requires certain additional information in order to route a VNET or 800 call.

Accordingly, system 11 includes a data access point (DAP) 29, which is a computer that holds number translation and call routing information for 800 and VNET services. When originating switch 15 receives a VNET or 800 call, it queries DAP 29 for call routing information. For example, if switch 15 receives an 800 number call from calling party 19 to a number owned by customer 23, DAP 29 provides switch 15 with information by which it routes the call through network 13 to terminating switch 17. Terminating switch 17 completes the call to customer 23 over a member of trunk group 27.

Customers 21 and 23 have elected selective trunk member termination services, according to the present invention. Selective trunk member termination services are provided according to the present invention by defining a terminating trunk member group parameter and a trunk group member range parameter. The terminating member trunk group parameter is applied to each trunk group of a switch of network 11. If a customer has elected selective trunk member termination, the terminating member trunk group parameter for the customer's trunk group is set to YES. Conversely, if the customer has not elected selective trunk member termination, the terminating member trunk group parameter for the customer's trunk group is set to NO. The trunk group member range parameter is part of the record for each number maintained in the DAP. If a customer has elected selective trunk member termination, then the DAP record for the customer's 800 numbers could have one trunk group range parameter and the customer's VNET numbers could have a different trunk group member range parameter.

Referring still to FIG. 1, if originating switch 15 receives, for example, an 800 number from calling party 19, originating switch 15 accesses DAP 29. DAP 29 returns to originating switch 15 routing information. If the customer that owns the 800 number has elected selective trunk group member termination, the information returned from DAP 29 will include a trunk group member range parameter. If the call is to a number owned by customer 23, originating switch 15 will transport the call through network 13 to terminating switch 17 with the trunk group member range parameter included in super generic digits or other signaling protocol. Terminating switch 17 will attempt to complete the call to customer 23 on a member of trunk group 27 within the range specified in the trunk group range parameter. Terminating switch 17 will also determine whether or not the terminating trunk group parameter for trunk group 27 is set to yes. If not, terminating switch 17 will still attempt to complete the call to one of the selected trunk group members, but will log an error.

Figure 2:
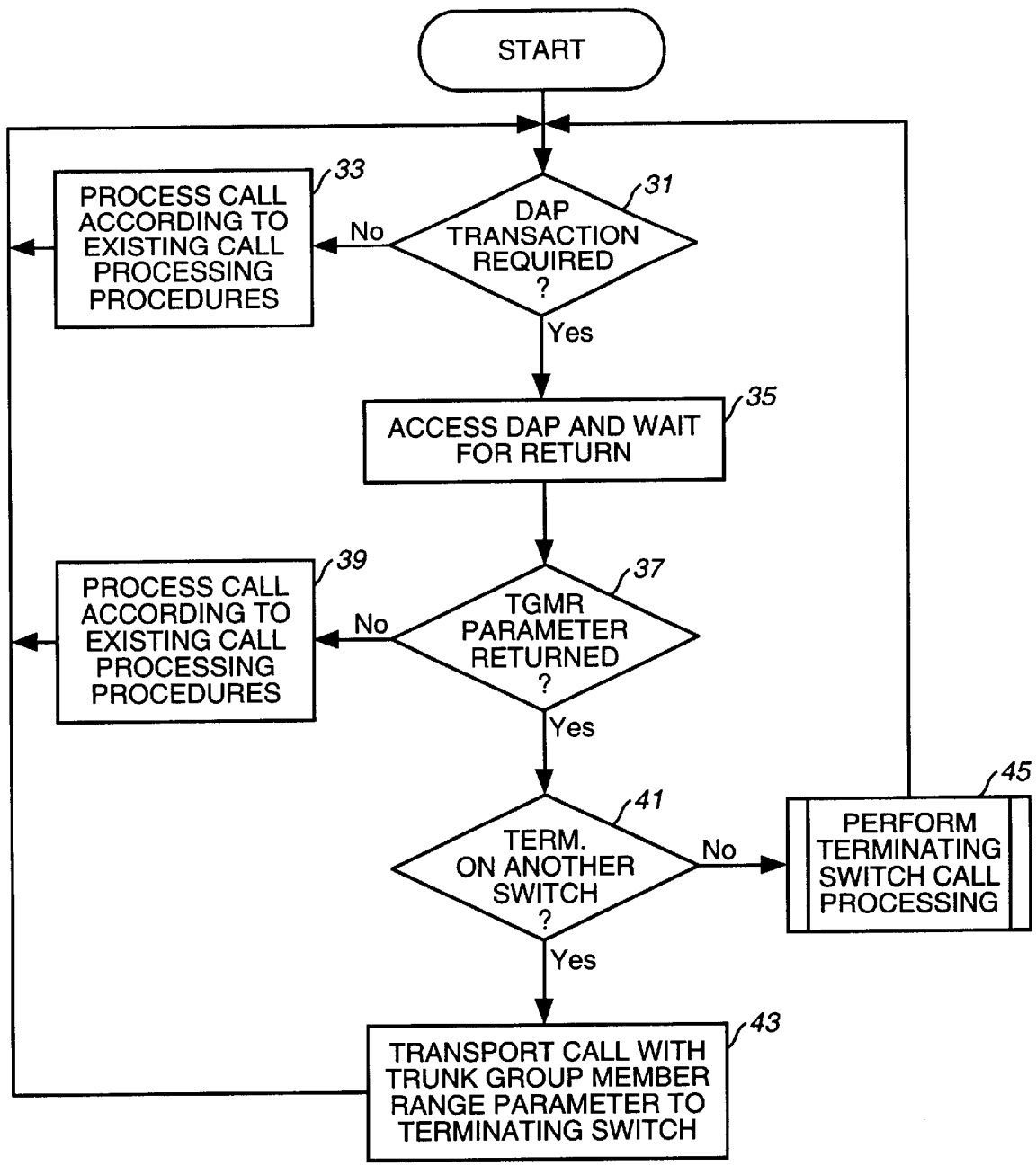
FIG. 2 is a flowchart of originating switch call processing according to the present invention.

Referring now to FIG. 2, there is shown a high level flowchart of originating switch processing according to the present invention. When an originating switch receives a call, it determines, at decision block 31, whether or not a DAP transaction is required. If the call is a normal call, no DAP transaction is required, and the switch processes the call according to existing call processing procedures, as indicated generally at block 33. If a DAP transaction is required, then the switch accesses the DAP and waits for return, at block 35. When the switch receives the return from the DAP, it determines, at decision block 37, whether or not the return includes a trunk group member range parameter. If not, the switch processes the call according to existing call processing procedures, as indicated generally at block 39. If the return does include a trunk group member range parameter, then the switch determines, at decision block 41, if the call is to be terminated on another switch of the network, in which case the switch transports the call with the trunk group member range parameter to the appropriate terminating switch, at block 43. If, at decision block 41 the call does not terminate on another switch, then the originating switch performs terminating switch call processing, as indicated generally at block 45.

Figure 3:
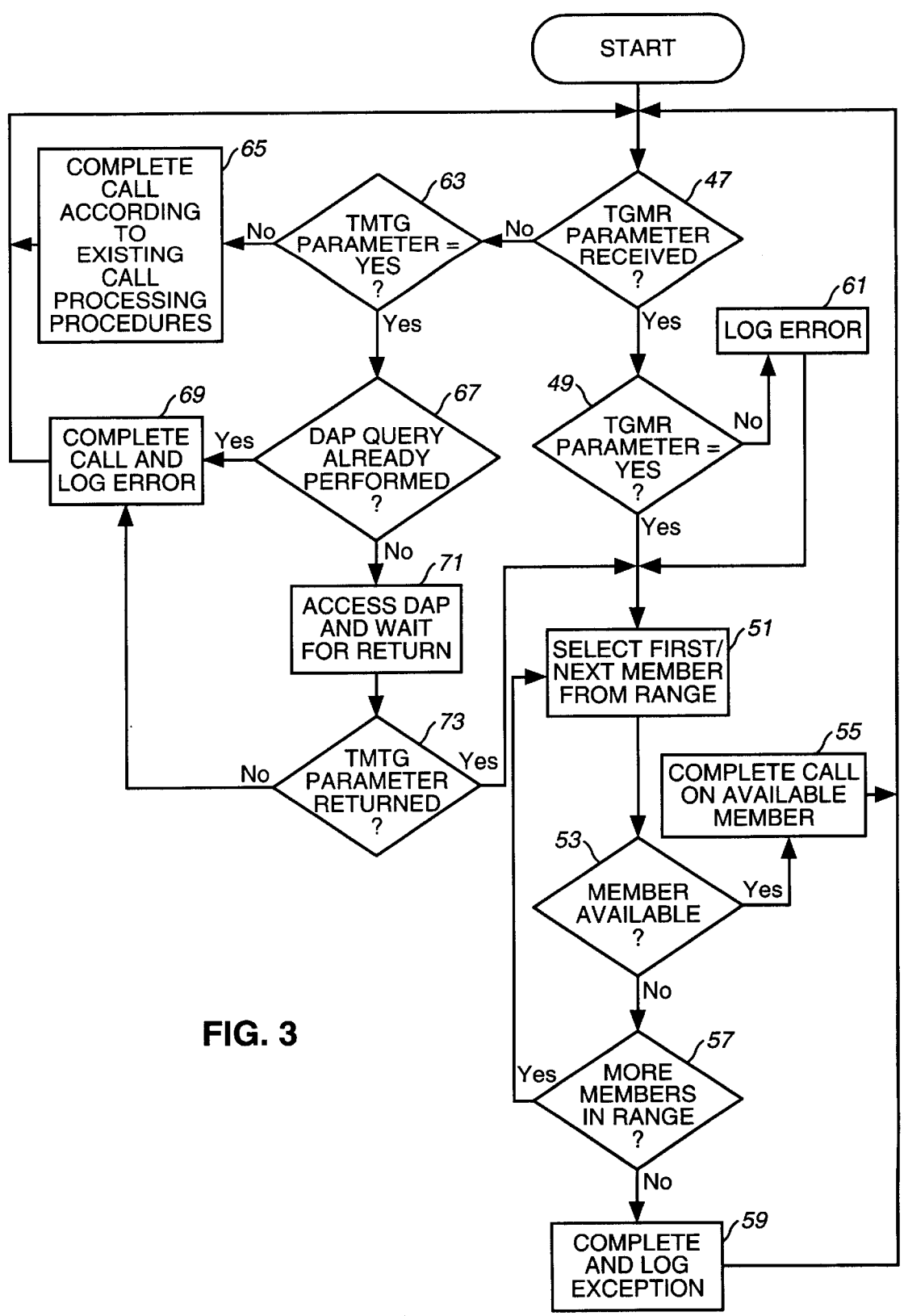
FIG. 3 is a flowchart of terminating switch call processing according to the present invention.

Referring now to FIG. 3, there is shown a flow chart of terminating switch call processing. When a terminating switch initiates call processing, it determines, at decision block 47, whether or not it has received a trunk group member range parameter, either along with a call transported from a different switch of the network or directly from the DAP for a call in which the terminating and originating switches are the same switch. If the terminating switch has received a trunk group member range parameter, then the terminating switch tests, at decision block 49 whether or not the terminating member trunk group parameter for the appropriate trunk group is set to yes. If so, the terminating switch attempts to complete the call in accordance with information in the trunk group member range parameter. Thus, at block 51, the terminating switch selects the first or next member from the range. Then, at decision block 53, the terminating switch determines whether or not the selected member is available. If so, the terminating switch completes the call at block 55. If, at decision block 53, the selected member is not available, then the terminating switch tests, at decision block 57, whether there are more members in the range. If so, processing continues at block 51 and the terminating switch selects the next member from the range. Thus, the terminating switch attempts to complete the call on a member of the range until all members have been tested. If, at decision block 57, there are no more members in the range, then the terminating switch completes the call to a member of the trunk group outside the range and logs the exception in an exception log, at block 59. The exception log is useful in determining whether the customer has designated an appropriate number of trunk group members for selective termination of calls of a particular type.

If, at decision block 49, the terminating member trunk group parameter is set to no, the terminating switch logs an error in an error log, at block 61, and then completes the call according to the trunk group member range parameter. A no result at decision block 49 indicates that there is a difference between the information at the DAP and the information at the terminating switch. The error log is useful inn correcting discrepancies between the switches and the DAP.

If, at decision block 47, a call is received without a trunk group member range parameter, then the terminating switch tests, at decision block 63 whether or not the terminating member trunk group parameter for the appropriate trunk group is set for yes. Normally, if a call is received without a trunk group member range parameter, then the terminating member trunk group parameter should be set to no. Thus, in the normal case, the terminating switch completes the call according to existing call processing procedures, as indicated at block 65. If, at decision block 63, the terminating member trunk group parameter is set to yes, then the terminating switch determines, at decision block 67, whether a DAP query has already been performed. If so, the terminating switch completes the call and logs an error in the error log, at block 69. If a DAP query has not already been performed, then the terminating switch accesses the DAP and waits for a return, at block 71. If the DAP returns a terminating member trunk group parameter, at decision block 73, processing continues at block 51 to complete the call according to information in the terminating member trunk group parameter. If, at decision block 73, the DAP does not return a terminating member trunk group parameter, then the terminating switch completes the call and logs an error in the error log, at block 69.

From the foregoing, it may be seen that the present invention provides selective trunk member termination services in a telecommunications network. The present invention is preferably implemented by adding two new parameters that the DAP and switches can process, without extensive reprogramming. Although the present invention has been illustrated and described with respect to a preferred embodiment, those skilled in the art will recognize that certain disclosed features may be used independently or in combination with other features.

What is claimed is:

1. A method of providing selective trunk group member termination service, which comprises the steps of:
   identifying each trunk group at a terminating switch of a plurality of switches that requires selective trunk member termination; and,
   identifying in a data access point available to said plurality of switches of a network, a set of trunk group members selected for selective trunk group member termination.

2. The method as claimed in claim 1, wherein said step of identifying each trunk group at a terminating switch that requires selective trunk member termination comprises the steps of:
   assigning to each trunk group of said terminating switch a terminating member trunk group parameter; and,
   setting said terminating member trunk group parameter to yes for each trunk group that requires selective trunk group member termination.

3. The method as claimed in claim 2, including the step of:
   setting said terminating member trunk group parameter to no for each trunk group that does not require selective trunk group member termination.

4. The method as claimed in claim 2, wherein said step of identifying in a data access point available to switches a set of trunk group members selected for selective trunk group member termination includes the step of:
   assigning a trunk group member range parameter to calls of a selected type to a selected customer.

5. The method as claimed in claim 4, including the steps of:
   receiving a call at an originating switch;
   accessing said data access point for call routing information for said call; and,
   returning from said data access point to said originating switch said terminating trunk group member range parameter if said call requires selective trunk group member termination.

6. The method as claimed in claim 5, including the step of:
   transporting said call from said originating switch to a terminating switch with said terminating trunk group member range parameter if said call requires termination at a switch other than said originating switch.

7. The method as claimed in claim 6, including the steps of:
   receiving said call at said terminating switch;
   attempting to terminate said call to a trunk group member identified by said terminating trunk group member range parameter.

8. The method as claimed in claim 6, including the steps of:
   receiving said call at said terminating switch; and,
   determining if said terminating member trunk group parameter is set to yes.

9. The method as claimed in claim 8, including the step of:
   attempting to terminate said call to a trunk group member identified by said terminating trunk group member range parameter.

10. The method as claimed in claim 8, including the steps of:
    attempting to terminate said call to a trunk group member identified by said terminating trunk group member range parameter; and,
    logging an exception if said terminating member trunk group parameter is not set to yes.

11. The method as claimed in claim 5, including the step of:
    attempting to terminate said call to a trunk group member identified by said terminating trunk member range parameter if said call requires termination at said originating switch.

12. The method as claimed in claim 11, including the steps of:
    determining if said terminating member trunk group parameter is set to yes; and
    logging an exception if said terminating member trunk group parameter is not set to yes.

13. The method as claimed in claim 4, including the steps of:
    receiving a call at a terminating switch that requires termination to a trunk group;
    determining if said terminating member trunk group parameter is set to yes; and,
    determining if said call is received with a terminating trunk member range parameter.

14. The method as claimed in claim 13, including the step of:
    attempting to complete said call a selected trunk group member if the terminating member trunk group is set to yes and said call is received with a truck group member range parameter.

15. The method as claimed in claim 13, including the steps of:
    attempting to complete said call a selected trunk group member if the terminating member trunk group is not set to yes and said call is received with a truck group member range parameter; and,
    logging an exception.

16. The method as claimed in claim 13, including the step of:
    accessing a data access point to determine a trunk group member range parameter if said terminating member trunk group parameter is set to yes and if call is received without a truck group member range parameter.

17. A system for providing selective trunk group member termination service, said system comprising:
    a plurality of switches, each of said switches including means for identifying each trunk group at said switch that requires selective trunk member termination; and,
    a data access point available to said switches, said data access point including means for identifying a set of trunk group members selected for selective trunk group member termination.

18. The system as claimed in claim 17, wherein each trunk group of each switch is assigned a terminating member trunk group parameter and said terminating member trunk group parameter is set to yes for each trunk group that requires selective trunk group member termination.

19. The system as claimed in claim 18, wherein said terminating member trunk group parameter is set to no for each trunk group that does not require selective trunk group member termination.

20. The system as claimed in claim 18, wherein said set of trunk group members selected for selective trunk group member termination are identified by a trunk group member range parameter.

21. The system as claimed in claim 20, including:

means for returning from said data access point to an originating switch said terminating trunk group member range parameter if said call requires selective trunk group member termination.

22. The system as claimed in claim 21, including:

means for transporting said call from said originating switch to a terminating switch with said terminating trunk group member range parameter if said call requires termination at a switch other than said originating switch.

23. The system as claimed in claim 22, including:

means for attempting to terminate said call to a trunk group member identified by said terminating trunk group member range parameter.

24. The system as claimed in claim 22, including:

means for determining if said terminating member trunk group parameter is set to yes at said terminating switch.

25. The system as claimed in claim 24, including:

means for logging an exception if said terminating member trunk group parameter is not set to yes.

* * * * *